United States Patent Office 3,187,169
Patented June 1, 1965

3,187,169
ELECTRONIC RESOLVER
Robert D. Trammell, Jr., Fort Knox, Ky., and Robert S. Johnson, Decatur, Ga., assignors to Georgia Tech Research Institute, Atlanta, Ga., a corporation of Georgia
Filed Feb. 28, 1961, Ser. No. 92,228
7 Claims. (Cl. 235—189)

This invention relates to an electronic resolver and is more particularly involved with an analog sampling computer for solving trigonometric functions wherein variables in the form of electrical effects are continuously fed to the computer and the function of the effects is derived substantially instantaneously and continuously therefrom.

In the past many resolvers have been devised and suggested. The earlier resolvers have usually been of the electro-mechanical type, the most common employing potentiometers or variable transformers. While these electro-mechanical resolvers are relatively accurate, they involve moving parts and hence would be considered extremely slow.

The faster and more modern all-electronic resolvers usually utilize diode function generators and electronic multipliers in the place of the sine and cosine potentiometers; however, this type of all-electronic resolver cannot provide solutions beyond one turn, i.e. solutions if the angular polar coordinate is greater than 360°.

Another type of all-electronic resolver is a sampling parametric computer of the general type such as disclosed in U.S. Patent No. 2,652,194. The sampling parametric computer is also limited in that the sinewave ringing generator of such a device must generate a constant amplitude thereby limiting solutions to problems wherein the magnitude of the radius vector is constant. Further, this type of device is incapable of operation selectively in both polar and rectangular modes.

The electronic resolver of the present invention is an all-electronic unit designed to operate selectively in both the polar and rectangular modes with high accuracy and at high speeds and is not limited to a single turn. The basic mathematical principles involve the generation of the two outputs (1)           $A \cos \theta - B \sin \theta$
(2)           $A \sin \theta + B \cos \theta$ where A, B and $\theta$ are the three possible inputs to the resolver.

Briefly, the present invention includes synchronized dual sources of amplitude modulated waveform capable of transformation into sinusoidal waveforms, selective sampling means for deriving an electrical effect, and dual means for converting said electrical effect into output signals. In one use one of the amplitudes of the modulated waveforms is made representative of the rectangular coordinates X, the other to Y, and dual output signals result representative of the polar coordinates, R and $\theta$. In another use only one amplitude modulated waveform is used and made representative of the polar coordinate R, the selective sampling means operates at time representative of the polar coordinate $\theta$, and dual output signals result representative of the rectangular coordinates, X and Y.

Accordingly, it is an object of the present invention to provide an electronic resolver capable of operating in both the rectangular mode and in the polar mode.

Another object of the present invention is to provide an electronic resolver which is capable of accepting input signals and delivering output signals varying over wide frequency and voltage ranges and is particularly compatible with standard direct-coupled electronic differential analyzers while at the same time being compatible, for example, with Fourier integral computers and direct coupled servo mechanisms and other control circuitry.

Another object of the present invention is to provide an electronic resolver which is inexpensive to manufacture and accurate and efficient in operation.

Another object of the present invention is to provide an electronic resolver which is capable of operation beyond one turn and is capable of solving trigonometric problems in which any parameter thereof may be a variable.

Another object of the present invention is to provide an electronic resolver which is capable of solving the following trigonometric equations wherein one or several of the inputs are variables:

(1)           $A \sin \theta$
(2)           $A \cos \theta$
(3)           $B \sin \theta$
(4)           $B \cos \theta$
(5)           $A \sin \theta + B \cos \theta$
(6)           $A \cos \theta - B \sin \theta$ where A, B and $\theta$ are possible inputs to the resolver.

Other objects, features and advantages of the present invention will become apparent from the following description when taken in conjunction with the accompanying drawings wherein like characters of reference designate corresponding parts throughout the several views and wherein.

The present invention may be better understood by reference to certain pages of the following standard publications:

Reference 1.—Electron Tube Circuits by Samuel Seely, published by McGraw-Hill Book Company, Inc., New York, N.Y., 1950.

Reference 2.—Waveforms by Britton Chance, Radiation Laboratories Series, vol. 19, published by McGraw-Hill Book Company, Inc., 1949.

Figure 1:
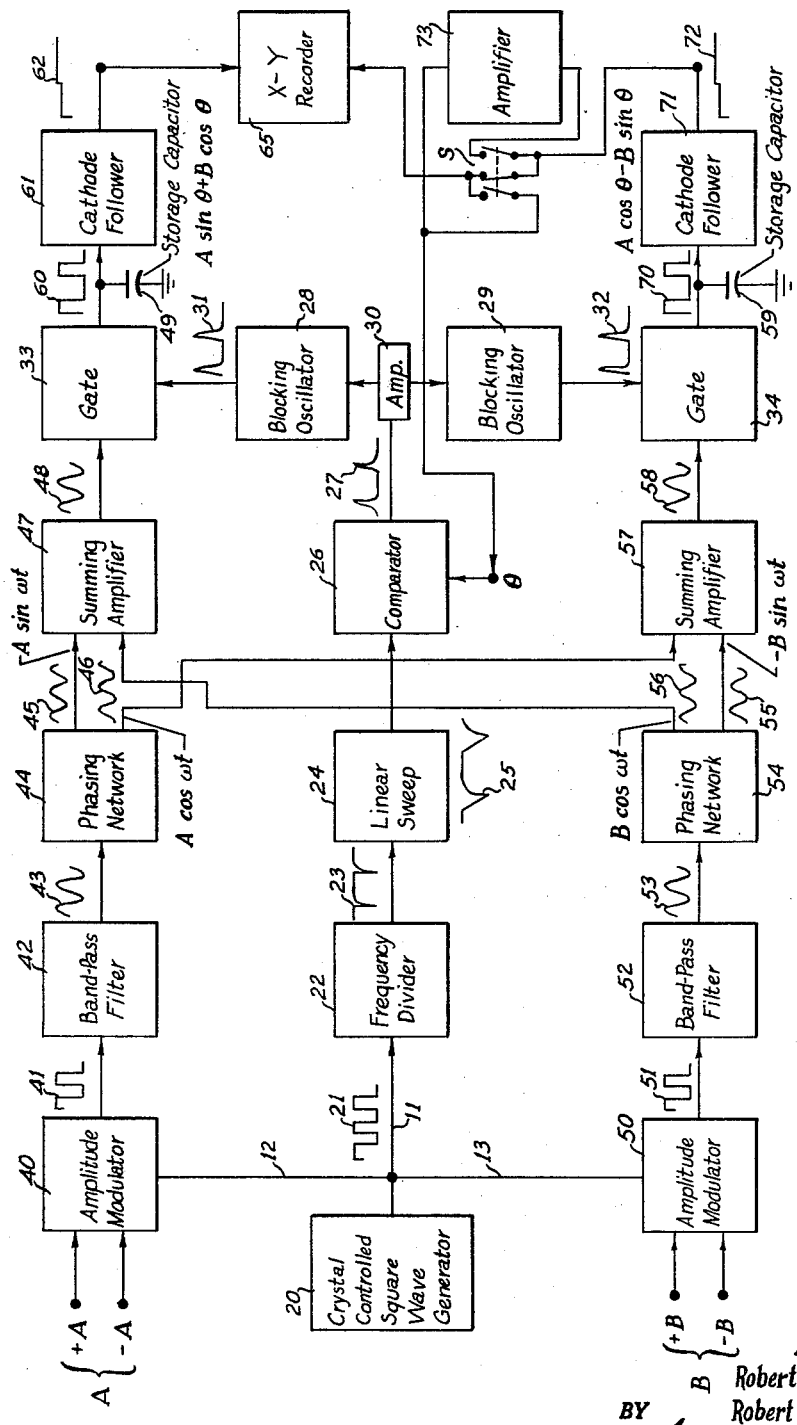
FIG. 1 is a more detailed schematic wiring diagram of the electronic resolver of the present invention.

Referring now in detail to the embodiment chosen for the purpose of illustrating the present invention and to FIG. 1 in particular, the electronic resolver element of the present invention includes a crystal-controlled square-wave generator 20. The circuitry of generator 20 preferably incorporates a crystal-controlled oscillator which is coupled to an overdriven amplifier (i.e., a voltage amplifier which is driven into cut-off and into saturation on alternate half-cycles of the input signal) to produce an output rectangular voltage waveform. The crystal oscillator may be of the type described in pages 256 and 257 of Reference 1. The overdriven amplifier may be of the type described on pages 127 and 128 of Reference 1. Together, the two units put out a square-wave voltage symbolically designated in FIG. 1 by numeral 21. In other words, square-wave generator 20 includes a sine wave generator and a limiting amplifier which converts by chopping the tops off of the sine waves, such sine waves into essentially square-waves of a given frequency. The square-wave impulses are fed in parallel lines or paths 11, 12 and 13, one being fed along path 11 to frequency divider 22 and the others being fed to amplitude modulators 40 and 50 along paths 12 and 13, respectively.

The frequency divider 22 accepts the output square-wave voltage waveform 21 of the crystal controlled square-wave generator 20 coupled through a standard resistive-capacitive differentiating network. The output voltage waveform from divider 22 consists of a sequence of negative voltage pulses 23 synchronized with the input square-wave signal 21 and occurring at a fixed fraction of the repetition rate of the input signal 21. The frequency divider 22 may take the form of the circuit described under "Monastable Multivibrators" on pages 572 to 575 of Reference 2.

The output 23 of the frequency divider 22 is next used to trigger the linear sweep circuit 24. Upon reception of a negative pulse 23 from the divider 22, the sweep circuit 24 initiates an output voltage waveform symbolically illustrated by numeral 25 which decreases linearly with time to a smallest value at which point it automatically recovers to the original state in readiness to receive the next negative trigger pulse. The number of cycles of the crystal-controlled square-wave generator 20 which transpire during one cycle of the operation of linear sweep 24 is determined by the dividing factor of the frequency divider circuit 22. It is therefore seen that a sawtooth sweep 25 is generated by linear sweep 24.

The linear sweep 24 instrumentation is realized through the circuitry discussed under "The Screen-Coupled Phantastron" on pages 197 to 200 of Reference 2.

From the linear sweep 24 the output voltage waveform or sawtooth sweep 25 is fed to a comparator 26 which, in addition, receives the polar input voltage signal variable $\theta$ which samples sweep 25 and delivers a positive pulse shown as waveform 27 at the instant of coincidence of the two inputs 25 and $\theta$. The sawtooth waveform 25 is delivered by the linear sweep 24 while the signal $\theta$ is fed in from an external source or from a feedback circuit to be discussed hereinafter. Thus when the linear sweep 24 output reaches the level $\theta$, the comparator 26 delivers a positive voltage pulse 27.

A typical comparator 26 which can be used for this purpose is the "multiar" device described on pages 343 and 344 of Reference 2.

From the comparator 26 the spaced voltage pulses 27 so generated are fed to a pair of blocking oscillators 28 and 29 respectively. The blocking oscillators 28 and 29 are identical circuits which are driven simultaneously by the comparator 26. The comparator 26 is coupled to the blocking oscillators 28 and 29 through a simple one-tube amplifier 30 as disclosed under "Parallel Triggering" on pages 219 and 220 of Reference 2.

The blocking oscillators 28 and 29 deliver respectively positive pulses 31 and 32 of sufficient power to actuate the gate circuits of electronic switches or gates 33 and 34, respectively, when the relatively weak positive pulses 27 of the comparator 26 appear. The blocking oscillators 28, 29 are of the form discussed on pages 205 to 211 of Reference 2.

As described above, the square-wave 21 is fed via paths 12 and 13 to a pair of parallel disposed amplitude modulators 40 and 50. It is the purpose of the amplitude modulators 40 and 50 to take the square-wave 21 generated by the crystal-controlled square-wave generator 20 and to deliver output square-waves designated by numerals 41 and 51 which waves are identical to the input 21 except that the amplitude is adjusted to a specified level by the simultaneous inputs of positive and negative complementary variables A and/or B. In other words, the amplitude is determined by an input to the amplitude modulators, i.e. A in the case of modulator 40, and B in the case of modulator 50. Thus, the outputs of modulators 40 and 50 are square-waves 41 and 51 of amplitudes A and B, respectively. A and B are voltages fed in from external sources.

The amplitude modulators 40 and 50 are instrumented as described on page 409 of Reference 2 and with reference to FIGURE 11.20 of that reference. Any one of the circuits shown in that figure will work; however, the one described under $a$ was actually used. The "bridge modulator" of this reference is an example of any one of several well known amplitude modulating circuits which would be suitable in the present invention.

From the modulators 40 and 50, the square-wave outputs exemplified by numerals 41 and 51 having varying amplitudes A and B, respectively, are fed to band-pass filters 42 and 52, respectively. It is the purpose of the band-pass filters 42 and 52 to accept these square-wave voltages or waveforms 41 and 51 from the amplitude modulators 40 and 50, respectively, and to produce output sinewave voltages 43 and 53 of amplitude proportional to the amplitude of square-waves 41 and 51. Thus, the sinusoidal output 43 of filter 42 is proportional to A while the sinusoidal output 53 of filter 52 is proportional to B. These band-pass filters 42 and 52 are any of many standard circuits including crystal filtering to obtain very pure sinusoidal form.

The sinusoidal output 43 is fed to a phasing network 44 while the sinusoidal output 53 is fed to a similar phasing network 54. The phasing networks 44 and 54 are used to shift the phases of the respective sinusoidal outputs of the band-pass filters 42 and 52, respectively, so as to obtain cosine voltage functions. If the input 43 to phasing network 44 is defined as $E_a$, (1) $\quad E_a = A \sin \omega t$ then the outputs 45 and 46 of phasing network 44 are the original input 43, $A \sin \omega t$, and the quadrature signal, $A \cos \omega t$. (The radian frequency $\omega$ is that of the crystal-controlled oscillator of generator 20.) If the input 53 to phasing network 54 is defined as $E_b$, (2) $\quad E_b = B \sin \omega t$ then the outputs 55 and 56 of phasing network 54 are the negative of the input, $-B \sin \omega t$, and the quadrature signal, $B \cos \omega t$.

Typical circuits useful for this phase shifting operation, i.e. phasing networks 43 and 53, are described on pages 136 to 140 of Reference 2.

Thus, it is seen that from the phasing network 44 there are two outputs 45 and 46 which may be respectively represented as the function of the input A, one output 45 being fed to one summing amplifier 47 and the other output 46 being fed to another summing amplifier 57. Similarly, the output 55 of phasing network 54 is fed to summing amplifier 57 and the output 56 is fed to summing amplifier 47.

The functions of the summing amplifiers 47 and 57 are to add respectively the inputs thereto, amplifier 47 adding inputs 45 and 56 and amplifier 57 adding inputs 55 and 46. It is now seen that the summing amplifiers 47 and 57 are used to combine the appropriate outputs of phasing networks 44 and 54 so as to obtain $$A \sin \omega t + B \cos \omega t$$

at the output of summing amplifier 47 and $$A \cos \omega t - B \sin \omega t$$

at the output of summing amplifier 57. The radian frequency $\omega$ is that of the crystal-controlled oscillator of amplifier 20.

The design of the summing amplifiers 47 and 57 is conventional; each amplifier comprises a plurality of amplification stages with suitable feedback and compensation networks to ensure stable, linear summation of the frequency of interest.

From the summing amplifiers 47 and 57, the output designated by numerals 48 and 59 is fed respectively to the gates 33 and 34. The gate circuitry of gates 33 and 34 may be thought of as high-speed, electronic switches which accept the outputs 47 and 57, respectively, and sample them upon command from the blocking oscillators 28 and 29. As the pulses 31 and 32 from the blocking oscillators 28 and 29 are applied to the gates 33 and 34, the gates 33 and 34 "open" respectively to allow the signals 48 and 58 from the summing amplifiers 47 and 57 to be applied to the associated storage capacitors 49 and 59 for the duration of the blocking-oscillator pulses 31 and 32. Thus the storage capacitors 49 and 59 are charged to values of the summing-amplifier outputs 48 and 58, respectively, at the instant of the blocking-oscillator pulses 31 and 32.

A typical high-speed gate is the four-diode bidirectional switch discussed on pages 372 and 373 (with reference to FIGURE 10.10a) of Reference 2.

The spaced pulses 60 and 70 thus generated by the gates 33 and 34 are next fed to cathode followers 61 and 71. The purpose of the cathode followers 61 and 71 is to provide a means of monitoring the voltage across the holding capacitors without causing these capacitors to discharge. The cathode follower in the schematic circuit illustrated in FIGURE 14.24 on page 519 of Reference 2 is typical of circuitry for this application. The cathode followers 61 and 71 may take the form of D.C. amplified spike filters.

The cathode followers 61 and 71 respectively provide continuous pulses symbolically illustrated at numerals 62 and 72, the pulses being a function of the charges on the respective cathode followers 61 and 71. Thus, if $E_{61}$ is the instantaneous output from cathode follower 61, then (3) $\qquad E_{61} = A \sin \theta + B \cos \theta$ If $E_{71}$ is the instantaneous output from cathode follower 71, then:

(4) $\qquad E_{61} = A \cos \theta - B \sin \theta$

It will be understood that the voltage outputs from cathode followers 61 and 71 may be utilized in many ways requiring additional circuitry for driving servo mechanisms and the like as mentioned above. For the purpose of illustrating one of many end uses, the cathode followers 61, 71 both feed to a X-Y recorder 65 wherein either polar or rectangular coordinates may be recorded, depending, of course, upon the "mode" in which the resolver is operating.

The output 62 of cathode follower 61 is fed directly to the recorder 65 while the output 72 of cathode follower 71 is selectively fed via switch S to a high gain amplifier 73 or to the recorder 65 for purposes to be described hereinafter. In FIG. 1 it will be seen that switch S will make a circuit from cathode follower 71 to amplifier 73 while breaking the circuit to the recorder 65 and vice versa.

A circuit leading from the amplifier 73 to the recorder 65 also is controlled by switch S so that when the circuit from cathode follower 71 to amplifier 73 is made, a circuit from the amplifier to the recorder 65 is simultaneously made. The output of the amplifier is fed to the comparator 26 as input $\theta$ as will be described hereinafter.

*Operation*

From the foregoing description, the operation of our resolver should be apparent. The crystal for the crystal-controlled square-wave generator 20 is selected so as to generate a waveform having a frequency of from 1,000 cycles to 100 kilocycles. In the device produced by us, we employ a 62 kc. crystal, even though say a 15 kc. crystal would be as suitable. The frequency divider 22 is arranged to divide the frequency generated by generator 20 by say four.

In the amplitude modulators 40 and 50, the voltage impulses varying within ±100 volts and corresponding to the values of A and B are fed thereto respectively. The $\theta$ input should also be between ±100 volts when appropriate.

*Rectangular mode of operation*

Figure 2:
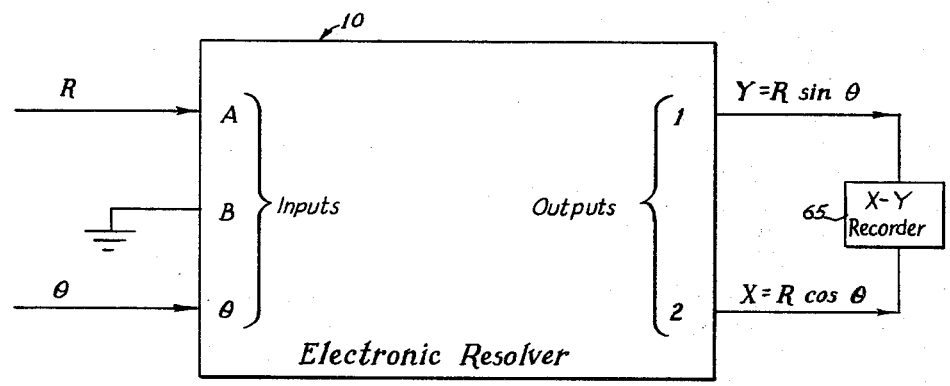
FIG. 2 is a schematic diagram of the electronic resolver of the present invention when operated in a rectangular mode.
Figure 3:
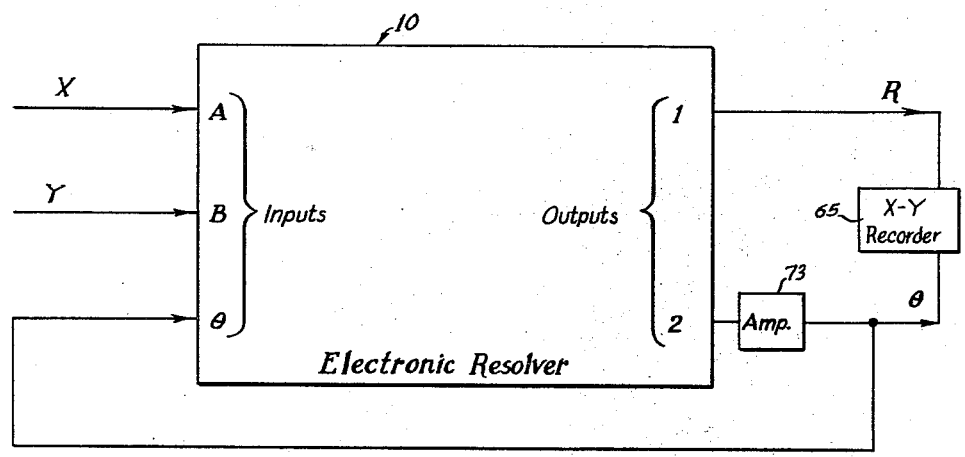
FIG. 3 is a schematic diagram of the electronic resolver of the present invention when operated in a polar mode.

When it is desired to operate the present device in the "rectangular mode," i.e. feed in the variables $\theta$ and R so as to derive the X and Y coordinates, the switch S is thrown so that the amplifier is excluded from the circuitry. This arrangement is illustrated in FIG. 2 wherein the voltage waveform corresponding to the magnitude of the radius vector R is fed to the resolver 10 for input A. In other words, R is fed to the amplitude modulator 40. Likewise, a waveform corresponding in voltage to the angle of the radius vector is fed to the comparator 26. In this particular arrangement, B is set to zero, i.e. the B terminals, both plus and minus of the amplitude modulator 50, are grounded so that no waveform 51 will be generated beyond the amplitude modulator 50. With $B=0$, the generation of $A \sin \theta + B \cos \theta$ by cathode follower 61 will result in the generation of simply $A \sin \theta$ or $R \sin \theta$ which is equal to Y.

Similarly, the generation of $A \cos \theta - B \sin \theta$ by cathode follower 71 will result simply in $A \cos \theta$ or $R \cos \theta$ which is equal to X. It is therefore seen that the apparatus of the present invention under these conditions of operation generates continuously the X and Y rectangular coordinates at the X-Y recorder 65.

*Polar mode*

The polar mode of operation is more complicated even though it involves simply the connection of the high gain amplifier 73 in line and the feeding of the waveform 72 from cathode follower 71 via amplifier 73 to the X-Y recorder and comparator 26 simultaneously.

For this purpose switch S is thrown from the position shown in FIG. 1 to its other position.

In the "polar mode," that is, when converting from rectangular to polar, it is necessary to utilize feedback through the high-gain amplifier 73 to ensure that output 72 (1) is kept very close to zero. This is done by feeding from cathode follower 71 to an amplifier 73 and thence to the $\theta$ input of comparator 26. If proper attention is given to feedback polarity, then:

$$A \cos \theta - B \sin \theta = 0$$

or $$\tan \theta = A/B$$

Further, it is understood that, under this condition:

$$R = (A^2 + B^2)^{\frac{1}{2}} = A \sin \theta + B \cos \theta$$

Therefore, the $\theta$ taken at the output of the feedback amplifier 73 and the output 62 now form the polar variables corresponding to the rectangular variables A and B.

In this mode of operation, the variable input for X is fed for the A input of modulator 40 and the Y coordinate variable input is fed for the B input of modulator 50. The resulting derivations are R and $\theta$.

It will be obvious to those skilled in the art that many variations may be made in the embodiments chosen for the purpose of illustrating the present invention without departing from the scope thereof as defined by the appended claims.

We claim:

1. An electronic resolver comprising means for generating an initial waveform capable of transformation to a sinusoidal waveform, means for modulating said initial waveform to provide a modulated waveform, gate means for deriving an electrical effect which is the function of a variable input and the frequency of said sinusoidal waveform, and means for sampling the modulated waveform with said electrical effect.

2. An electronic resolver comprising means for generating a linear sweep, means for generating a sinusoidal waveform synchronized with said linear sweep, input means for a first variable input and a second variable input, means for comparison of said linear sweep with said first variable input whereby a triggering voltage is generated as a function of both said linear sweep and said first variable input, means for modulating said sinusoidal waveform with the second variable input to provide a modulated waveform, means actuated by said triggering voltage for sampling the modulated waveform, and means for storing the results of sampling the said modulated waveform.

3. An electronic resolver comprising means for generating an initial waveform, means for generating a linear sweep synchronized with the initial waveform generated by said means for generating an initial waveform, input means for a first variable input and a second variable input, means for comparison of said linear sweep with said first variable input for producing a triggering voltage, means for producing a sinusoidal waveform synchronized with said initial waveform, means for modulating the amplitude of said sinusoidal waveform with the second variable input to provide a modulated waveform, means actuated by said triggering voltage for sampling said modulated waveform, and means for storing the results of sampling the said modulated waveform.

4. An electronic resolver comprising means for generating an initial waveform, means for generating a linear sweep synchronized with the initial waveform generated by said means for generating an initial waveform, input means for a first variable input and a second variable input, means for comparison of said linear sweep with said first variable input whereby a triggering voltage is generated as a function of both said linear sweep and said first variable input at the time of coincidence, means for producing a sinusoidal waveform synchronized with said initial waveform, means for modulating the amplitude of said sinusoidal waveform with the second variable input to provide a modulated waveform, means actuated by said triggering voltage for sampling said modulated waveform, and means for storing the results of sampling the said modulating waveform.

5. An electronic resolver comprising means for generating an initial waveform, means for generating a linear sweep synchronized with the initial waveform generated by said means for generating an initial waveform, input means for a first variable input, means for comparison of said linear sweep with said first variable input whereby a triggering voltage is generated as a function of both said linear sweep and said first variable input, means for producing a first sinusoidal waveform and a second sinusoidal waveform synchronized with said initial waveform, input means for second variable input and a third variable input, means for modulating the first sinusoidal waveform with the second variable input to provide a first modulated waveform and for modulating the second sinusoidal waveform with the third variable input to provide a second modulated waveform, means for shifting the phase of said modulated waveforms and for summing the phase shifted waveform of the first modulated waveform with the second modulated waveform and for summing the phase shifted waveform of the second modulated waveform with the first modulated waveform to produce resulting waveforms, means actuated by said triggering voltage for simultaneously sampling said resulting waveforms, and means for storing the results of sampling said resulting waveforms.

6. An electronic resolver comprising means for generating an initial waveform, means for generating a linear sweep synchronized with the initial waveform generated by said means for generating an initial waveform, input means for a first variable input, means for comparison of said linear sweep with said first variable input whereby a triggering voltage is generated as a function of both said linear sweep and said first variable input, means for producing a first sinusoidal waveform and a second sinusoidal waveform synchronized with said initial waveform, input means for second variable input and a third variable input, means for modulating the amplitude of the first sinusoidal waveform with the second variable input to provide a first modulated waveform and for modulating the amplitude of the second sinusoidal waveform with the third variable input to provide a second modulated waveform, means for shifting the phase of said modulated waveforms and for summing the phase shifted waveform of the first modulated waveform with the second modulated waveform and for summing the phase shifted waveform of the second modulated waveform with the first modulated waveform to produce resulting waveforms, means actuated by said triggering voltage for simultaneously sampling said resulting waveforms, and means for storing the results of sampling said resulting waveforms.

7. An electronic resolver comprising means for generating an initial waveform, means for generating a linear sweep synchronized with the initial waveform generated by said means for generating an initial waveform, input means for a first variable input, means for comparison of said linear sweep with said first variable input whereby a triggering voltage is generated as a function of both said linear sweep and said first variable input, means for producing a first sinusoidal waveform and a second sinusoidal waveform synchronized with said initial waveform, input means for second variable input and a third variable input, means for modulating the first sinusoidal waveform with the second variable input to provide a first modulated waveform and for modulating the second sinusoidal waveform with the third variable input to provide a second modulated waveform, means for shifting the phase of said modulated waveforms and for summing the phase shifted waveform of the first modulated wave form with the second modulated waveform and for summing the phase shifted waveform of the second modulated waveform with the first modulated waveform to produce resulting waveforms, means actuated by said triggering voltage for simultaneously obtaining samples of both of said resulting waveforms, means for storing said samples of said resulting waveforms, and means for amplifying one of said samples and feeding the amplified sample to the means for comparison of said linear sweep with said first variable input.

References Cited by the Examiner
UNITED STATES PATENTS

| 2,754,056 | 7/56 | Friedman | 235—151 |
| 2,926,852 | 3/60 | Bennett | 235—189 |
| 2,994,779 | 4/61 | Brouillette | 235—193 XR |

MALCOLM A. MORRISON, *Primary Examiner.*

WALTER W. BURNS, *Examiner.*